April 10, 1956     F. C. ARMISTEAD     2,741,708
RADIATION DETECTION
Filed April 27, 1951
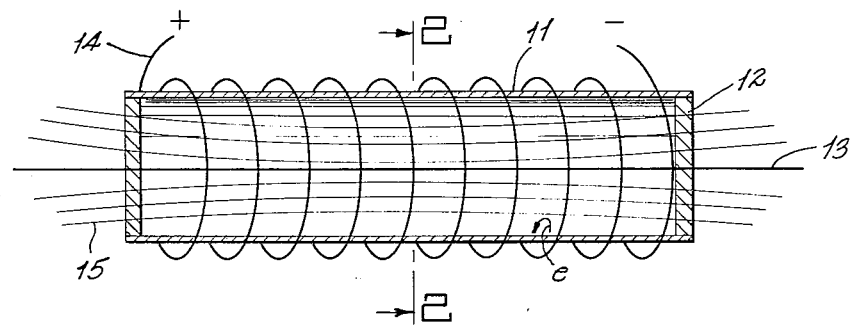
Fig.1.
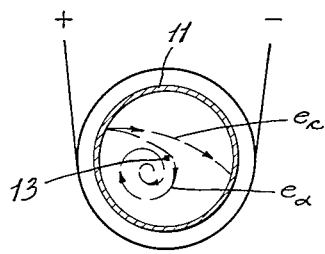 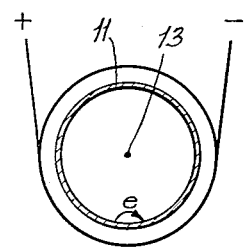 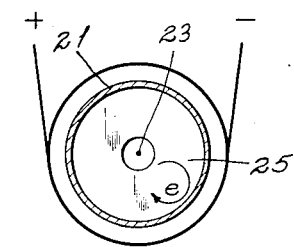
Fig.2.     Fig.4.     Fig.5.
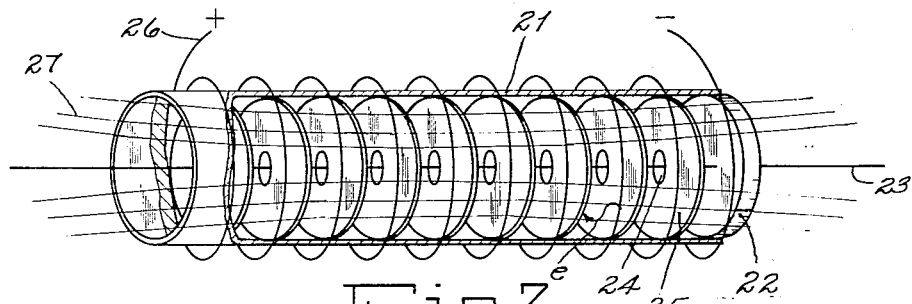
Fig.3.
INVENTOR.
FONTAINE C. ARMISTEAD
BY
ATTORNEYS

United States Patent Office 2,741,708
Patented Apr. 10, 1956

2,741,708
RADIATION DETECTION

Fontaine C. Armistead, Marblehead, Mass., assignor to Texaco Development Corporation, New York, N. Y., a corporation of Delaware Application April 27, 1951, Serial No. 223,231

6 Claims. (Cl. 250—83.6)

This invention relates to the detection of radiation and more particularly to differentiation between different types of radiation.

In the detection of radiation, particularly penetrative radiation such as gamma rays, a number of different types of radiation including cosmic radiation are simultaneously detected by the same instrument or counter in which case it is very difficult to distinguish one type of radiation from another and to obtain accurate readings on any particular type of radiation. For example, in the measurement of gamma radiation by means of such a well-known instrument as the Geiger-Mueller counter, cosmic rays are counted as well as the gamma rays. Even the proportional counter is unable to differentiate between gamma rays and the major part (more than 90%) of the cosmic rays. Thus the total count represents both types of radiation and it is difficult to distinguish therebetween. While combinations of counters combined with coincidence and anti-coincidence counting circuits have been proposed for differentiating between such types of radiation, such combinations require extensive apparatus and involved circuitry.

In contrast thereto, the present invention has as an object the provision of a relatively simple method whereby two types of radiation of different energies can be readily differentiated.

Other objects and advantages of the invention will appear from the following description taken in connection with the attached drawings wherein:

Fig. 1 is a section taken on the axis of a conventional proportional counter modified in accordance with the present invention.

Fig. 2 is a section taken on the line 2—2 of Fig. 1.

Fig. 3 is a perspective shown partly in section of a modified form of the counter of Fig. 1.

Fig. 4 is a transverse section of the counter of Fig. 1 illustrating the path of an electron therein.

Fig. 5 is a similar section through the counter of Fig. 3 illustrating the path of an electron therein.

Briefly, the present invention involves a method of differentiating between radiations of different energies in a counter by subjecting the counter to the influence of a magnetic field. More specifically, the invention is concerned with a method of differentiating between penetrative radiation such as gamma rays and cosmic rays by subjecting the different types of radiation within the counter such as a proportional counter to the influence of a magnetic field whereby the radiation of lower energy is caused to travel in the counter in a longer path than the radiation of higher energy.

The invention can best be explained by example. Fig. 1 illustrates a proportional counter of conventional type having a tubular cathode 11 provided with end enclosures 12 and a wire 13 through the center thereof which functions as the anode. Such counters can be regarded as only slight modifications of the Geiger-Mueller counter. The proportional counter differs from the Geiger-Mueller counter in that it operates at lower voltage with the result that pulses are not all amplified to saturation as in the Geiger-Mueller counter, but are amplified to only a limited extent, and thus retain their distribution in size. To facilitate operation in the "proportional region" the proportional counter usually has higher gas pressure and larger anode wire than the Geiger-Mueller wire. It will be understood that such a counter will be connected to the usual amplifier, pulse discriminator and counting circuit in well known manner. Since such elements form no part of the present invention, a detailed description thereof is considered unnecessary.

The counter of Fig. 1, as thus far described, does not differentiate between similar radiations of different energies such as between the electron component of cosmic radiation and gamma rays since both types of rays in passing through the counter cause ionization paths of the same length and about the same ion density, i. e., the same number of ions per unit length in the counter gas. All components of cosmic radiation with an energy in the order of 10 m. e. v. or greater will pass all the way through the counter tube as will most of the electrons ejected by gamma rays of the order of 1 m. e. v. energy. Since the cosmic ray electron has a velocity of 99.9% the velocity of light and the gamma ray electron a velocity of 94% of the velocity of light and the amount of ionization caused per unit length depends on the squared velocity of the charged particle, it follows that the ion density will be about the same for both types of electrons.

However, by subjecting the counter to the influence of a magnetic field, shown graphically in Fig. 1 by coil 14 surrounding the tube and magnetic lines of force 15, advantage can be taken of the different energies of the two types of radiation whereby the cosmic radiation continues its substantially normal path through the counter and the electron of lesser energy caused by the gamma radiation (the so-called secondary electron) can be caused to follow a curved path within the counter and expend substantially all its energy in producing ions within the counter tube.

For example, under the influence of a 5,000 gauss field, a 1 m. e. v. electron, i. e., the gamma electron $e\alpha$, (the secondary electron by which the gamma ray is detected) can be made to curve in a path having a radius in the order of 0.96 cm. whereas the most easily curved component of the cosmic ray, i. e., the electron component $e_c$ having energies upward of 10 m. e. v. is only curved on a radius of 7 cm. or more. More than 90% of the cosmic rays counts in a counter tube are due to this electron component and to the fast meson component. The fast mesons with energies upward of 100 m. e. v., have only slightly more ionizing power than the electron component and are curved even less by the magnetic field. Throughout this specification the term 10 m. e. v. cosmic ray electron is representative of and is intended to indicate the aforesaid 90% cosmic ray particles, because if one can differentiate the gamma ray from this 10 m. e. v. electron one can, with equal or better success, differentiate it from the rest of the 90%. Thus a cosmic ray would make of the order of 100 ion pairs within the counter whereas a gamma electron expending all its energy within the tube would make of the order of 10,000 pairs.

The large difference in the lengths of the paths of the cosmic component $e_c$ and the gamma electron $e\alpha$ is evident from Fig. 2, a cross section of the counter of Fig. 1. As will be noted therein, electron $e_c$ is curved only slightly in its path and the length of the path as related to a straight path is substantially the same. On the other hand, the path of $e\alpha$ as related to the usual straight path is much longer and the electron is caused to expend substantially all its energy within the counter tube.

This difference in respect of the electrons of different energies can be explained by the theory of relativity. As set forth in that theory, particles with velocities approaching that of the velocity of light have considerably more mass than they do when at rest, and the more energetic the particle, the larger is its "relativistic mass." The ratio of the relativistic masses of two electrons of different energies is obtained by taking the ratio of the kinetic energy of the first plus its "rest mass" (0.51 m. e. v.) to the kinetic energy of the second plus its rest mass. Thus the ratio of the masses of 10 m. e. v. and 1 m. e. v. electrons is 10.51/1.51 or approximately 7.

In the present invention, the discrimination or differentiation between electrons of high energies and low energies is based on the different curvatures given to the high and low energy electrons in the same field, the high energy electrons swinging wide and the low energy electrons curving sharply. Stated otherwise, by way of pictorial explanation as evidenced in Fig. 2, the more massive electron $e_c$ swings through a curvature of relatively long radius and the less massive $e_\alpha$ curves sharply.

Since momentum as understood by the physicist involves mass along with velocity, an electron of 10 m. e. v. might be described as a 35,000 gauss-cm. electron and an electron of 1 m. e. v. as a 4,700 gauss-cm. electron. The gauss-cm. unit can be taken as a unit of momentum and in that respect it functions conveniently since it indicates directly the curvature an electron will have in a field of a certain strength. For instance, a 5,000 gauss field would cause an electron having an energy of 10 m. e. v. to curl with a 7 cm. radius. The same field would cause a 1 m. e. v. electron to curl with a radius of less than 1 cm.

In addition to increasing the length of the path of the electron of lower energy as explained in connection with Fig. 2, there is a further advantage of the invention. This advantage resides in the fact that an electron such as a gamma ray electron $e_\alpha$ which terminates or substantially terminates its path in the gas space of the counter will form more ion pairs per cm. of the path toward the end of its path than during the first portion of the path. This is the well known effect of increased specific ionization of a charged particle just before it is brought to rest and is usually depicted graphically as "The Bragg Curve." On the other hand, the cosmic ray electron $e_c$ will not end its path in the counter and will have a specific ionization of the same low magnitude throughout its path in the counter as the initial portions of its own path and the gamma ray component. Therefore, in discriminating between electrons of different energies such as between the secondary electrons from gamma rays and the electrons in cosmic rays, the invention not only has the benefit of the longer path length of the electron of lower energy, i. e., the gamma electron, but also its higher average specific ionization throughout its path of travel through the counter gas. Obviously both effects cooperate to make the gamma ray effect as respects the counter much larger than the cosmic ray effect.

Fig. 3 illustrates a modified form of counter having a tube 21, end enclosures 22 and an axially disposed anode wire 23. The latter passes through apertures 24 centrally positioned in a series of axially spaced plates 25 which extend throughout the counter as shown in Fig. 3 to form a cathode assembly. Such a counter as thus far described is described in Patent No. 2,397,071 issued to D. G. C. Hare March 19, 1946. When this type of counter is subjected to the action of a magnetic field as by a coil 26 forming lines of magnetic force 27, the counter becomes able to differentiate between electrons of different energies in the same manner as the more conventional counter of Fig. 1. It should be noted that the counter of Fig. 3 resembles that of the Hare patent only as respects physical construction, the high voltage, gas pressure, and/or geometry of the parts being so adjusted as to make the counter operate as a proportional counter as distinguished from a counter of the Geiger-Mueller type.

The counter of Fig. 3 has an advantage over the counter of Fig. 1 in that with the counter of Fig. 1 as shown in Fig. 4, some electrons will be ejected from the cathode tube at such an angle that the magnetic field will curve them back into the cathode wall before they will have travelled any great distance. This is illustrated by electron $e$ as shown in Fig. 1 and Fig. 4. Such events are recorded as small pulses and would be discriminated out, thereby causing a reduced gamma ray efficiency.

However with the use of cathode plates 25 as shown in Fig. 3 which are substantially perpendicular to the magnetic field, the ejected electron $e$ cannot be spiraled back into the cathode assembly 25 from whence it came since the plate is in a plane perpendicular to the magnetic field. This can be explained by assuming an axial magnetic field as shown in the drawing and the assumption that the electron ejected by the gamma ray from the cathode has some axial component of velocity. With the counter of Fig. 1, electron $e$ at certain angles will be curved back into the cathode before it can travel any appreciable distance. In Fig. 3 since the ejected electron comes from a plate cathode which is perpendicular to the magnetic field, it follows a spiralling or corkscrew path as shown at $e$ in Fig. 3 and at $e$ in Fig. 5 and remains within the counter.

Magnetic fields of the types required are not difficult to attain. They may be easily attained in the laboratory and can be obtained in the field by four lead acid storage batteries providing one ampere at 24 volts. Such a current supply can supply the field for a 3" x 30" counter in a solenoid of 7 layers of #18 B. & S. copper wire totaling 5,000 turns.

While the magnetic field in the drawings has been shown in a position to set up lines of force axially of the counters, it is to be understood that the field can be set up in any position relative to the counter provided that the counter is embraced thereby.

From the foregoing it is believed evident that the present invention provides a relatively simple method for accurately differentiating between electrons of different energies in the relativistic velocity range and consequently between certain different types of radiation which are not differentiated by the ordinary proportional counters. By reason of the increased length of the ionization path of the electron of lower energy within the counter and the increased ionization effect as the electron approaches the end of its path, the net ionization created by the electron of lower energy greatly exceeds that of the electron of higher energy whereby the two can be readily differentiated.

In the appended claims, the term "radiation" is intended to mean both the particle type and the electromagnetic wave type of radiation except when mention is made of the magnetically curved paths of the radiation, in which cases the charged particle type is meant.

Obviously many modifications and variations of the invention, as hereinbefore set forth, may be made without departing from the spirit and scope thereof, and therefore only such limitations should be imposed as are indicated in the appended claims.

I claim:

1. Radiation detection apparatus comprising a gas-filled radiation detector of the proportional counter type and means for producing through most of the discharge space within the detector a magnetic field for curving within said space the paths of electron by-products which escape thereinto from adjacently occurring radiation-interactions, the field being of sufficient intensity to substantially deviate electrons having less than relativistic velocities and insufficient intensity to substantially deviate electrons having relativistic velocities.

2. Radiation detection apparatus comprising a gas-filled radiation detector of the proportional counter type and means for producing through most of the discharge space within the detector a magnetic field for curving within said space the paths of electron by-products which escape therein from adjacently occurring radiation-interactions, the field being of sufficient intensity to effect substantial deviation of an electron having less than a predetermined relatively low velocity in terms of the terminal velocity but insufficient intensity to do so for an electron having more than a predetermined relatively high velocity in terms thereof.

3. The method of operating a gas-filled radiation detector in the proportional counter region, in order to detect penetrative radiation in a manner that distinguishes between counts produced by radiations of different energies, for example in order to eliminate cosmic-ray-induced counts while detecting gamma rays, comprising the steps of causing radiations of different energies to interact with material within the detector such as its cathode to produce ionizing particles of different energies corresponding to the energy of said radiation and subjecting the space within the counter to the influence of a magnetic field extending transversely to the principal approach directions of the radiations and of sufficient strength to cause ionizing particles of relatively low energy, such as an electron projected into the interior of the detector from its cathode as a by-product of an interaction of a gamma ray therein, to travel within the counter in a curved path of relatively small radius while allowing an ionizing particle of relatively high energy, such as an electron component of a cosmic ray, to travel within the counter in a far less curved path, whereby the path of travel within the counter of the particle of relatively low energy is relatively long compared to the path of travel within the counter of the particle of greater energy and the total ionization effect of each particle of relatively low energy is rendered substantially greater than the total ionization effect of each particle of higher energy radiation.

4. In the operation of a gas-filled radiation detector of the proportional counter type wherein one or more metallic plate members are used as a cathode, each plate being provided with at least one hole, and a wire extending through the hole and insulated from the plates is used as an anode, a method of detecting penetrative radiation in a manner that distinguishes between counts induced by radiation of different energies, for example in order to eliminate cosmic-ray-induced counts while detecting gamma rays, comprising the steps of causing radiations of different energies to interact with material within the detector such as its cathode to produce ionizing particles of different energies corresponding to the energy of said radiation and subjecting the counter to the influence of a magnetic field extending thru it transversely to the principal approach directions of the radiation and of sufficient strength to cause an ionizing particle of relatively low energy and a transverse direction of motion with respect to said field to travel within the counter in a curved path of relatively small radius while permitting an ionizing particle of relatively high energy and a similar direction of motion to travel within the counter in a far less curved path, whereby the path of travel within the counter of the particle of relatively low energy is relatively long compared to the path of travel within the counter of the particle of relatively high energy and the total ionization effect of the particle of lower energy is rendered substantially greater than the total ionization effect of the particle of higher energy.

5. Radiation detection apparatus as defined in claim 1 wherein said radiation detector comprises a cathode member including a plurality of electrically interconnected plates disposed in separated relation, each of said plates being provided with at least one aperture therein, said apertures being in alignment, and an anode member extending through said aligned apertures.

6. Radiation detection apparatus as defined in claim 1 wherein said radiation detector comprises a plurality of plates arranged in a substantially parallel bank and connected together electrically to form a cathode, said plates being separated slightly to form spaces therebetween, each of said plates being provided with at least one aperture therein, the respective apertures being disposed in a line extending transversely through said bank, an anode wire extending through said apertures, and wherein the axis of said magnetic field is substantially parallel with the said anode wire.

References Cited in the file of this patent

UNITED STATES PATENTS 2,447,260    Marton _____ Aug. 17, 1948
2,574,632    Engelkemeier et al. _____ Nov. 13, 1951

OTHER REFERENCES

"The Determination of Gamma Ray Energies with the Magnetic Lens Spectrometer," Jensen AECD, 2399 Dec. 3, 1948, published by U. S. Atomic Energy Commission pp. 1–70.

"Increased Gamma-Ray Sensitivity of Tube Counters etc.," Evans et al., Rev. of Scientific Instruments Dec. 1936, vol. 7, pages 441–449.

"Cosmic Rays," Janossy, publ. by Oxford Univ. Press, London, England, first ed., 1948, pages 225–229.

"Introduction to Modern Physics," Richtmyer et al., publ. by McGraw-Hill Book Co., Inc., New York, N. Y., 1947, pages 686–704.